Feb. 19, 1929.
H. T. PAISTE
1,703,046
SOCKET CAP CORD CONNECTION
Filed July 12, 1927
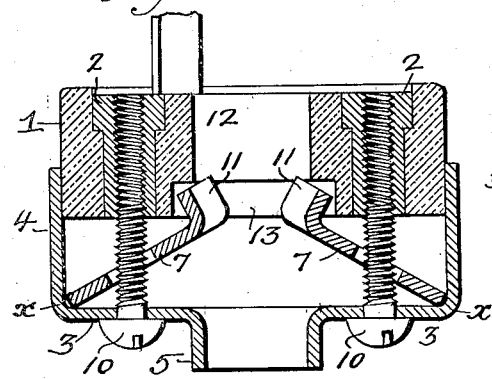
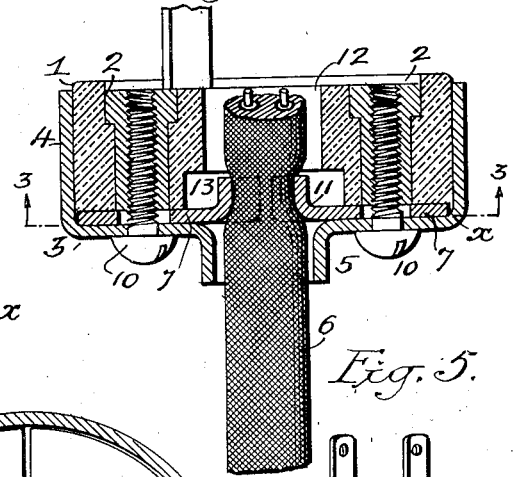
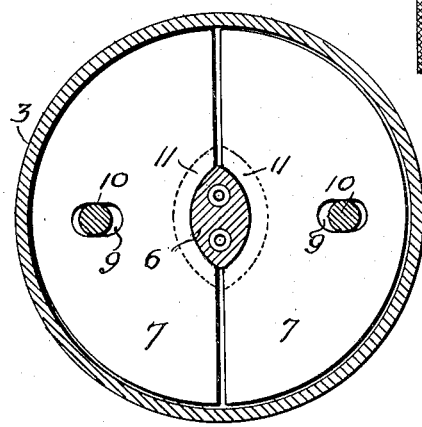
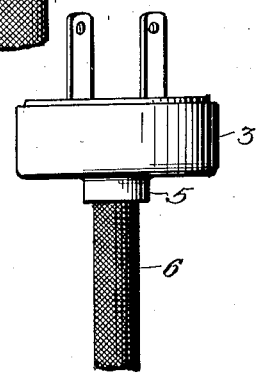
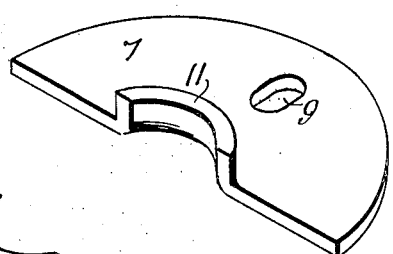
Inventor:-
Henry T. Paiste,
by his Attorneys Patented Feb. 19, 1929.

1,703,046

UNITED STATES PATENT OFFICE.

HENRY T. PAISTE, OF PHILADELPHIA, PENNSYLVANIA, ASSIGNOR TO H. T. PAISTE COMPANY, OF PHILADELPHIA, PENNSYLVANIA, A CORPORATION OF PENNSYLVANIA.

SOCKET-CAP CORD CONNECTION.

Application filed July 12, 1927. Serial No. 205,098.

My invention relates to certain improvements in means for holding a cord to the socket cap of an electric fixture.

The object of my invention is to provide means whereby the cord will be clamped securely to the cap, and to so locate the means within the cap that the clamping mechanism will not be exposed to view.

In the accompanying drawing:

Fig. 1 is a sectional view of a socket cap cord connection illustrating my invention, showing the clamps spaced apart to allow for the insertion of a cord;

Fig. 2 is a sectional view similar to Fig. 1, showing the cord in position and the clamps securely attached to the cord;

Fig. 3 is an inverted sectional plan view on the line 3—3, Fig. 2;

Fig. 4 is a detached perspective view illustrating the two clamps;

Fig. 5 is a view in elevation showing the socket cap and the cord depending therefrom; and Fig. 6 is a view showing a portion of the cap pressed in to form sockets for the clamping members.

1 is the body portion of porcelain or other nonconducting material having a central opening 12 which is enlarged as as 13, and in this body portion are openings for the reception of two shouldered nuts 2—2.

3 is a cap having a deep flange 4 which fits over the body portion 1 as shown, the cap having a flanged opening 5 for the cord 6, as shown in Figs. 2 and 5.

Located within the cap are two clamping members 7—7, as clearly shown in Fig. 4. These members are segmental in shape and fit against the inside corners $x$—$x$ of the cap.

The clamps have slots 9—9 therein through which extend the screws 10—10 which are adapted to the threaded openings in the nuts 2—2.

On the inner end of each clamp is a segmental flange 11, preferably rounded as shown. When the cap is in position, as illustrated in Fig. 1, the clamping members are spaced apart and the cord 6 can be readily inserted in the cap. This cord extends into the opening 12 in the body portion. The screws are then turned so as to draw the cap 3 towards the body portion, this movement causing the clamping members to move in the corners $x$—$x$ and gradually close upon the cord 6.

When the cap has reached the position shown in Fig. 2, with the clamping members located between the cap and the body portion, the clamping members grip the cord 6 so tightly that it cannot be pulled away from the cap and its connections. In this construction the clamping mechanism is within the cap, and adjustment of the clamping members is made by means of screws, the heads only of which are on the outside of the cap.

When it is desired to detach the cord from the socket cap, all that is necessary is to back off the screws, which separate the cap from the body portion, and the parts will assume the position shown in Fig. 1, permitting the withdrawal of the cord.

In some instances, sockets may be formed at the corners $x$—$x$ of the cap by pressing in a portion of the cap as shown at 8, Fig. 6.

I claim:

1. The combination in a socket cap cord connection, of a body portion; a cap; clamping means for a cord located within the cap; and screws in operable relationship with said body portion and said cap, for operating the clamping means.

2. The combination in a socket cap cord connection, of a non-conducting body portion having a central opening therein; two nuts located in the body portion; a cap; screws extending through the cap and into the nuts; and clamping members between the nuts and the body portion, the clamping portions of said clamping members being moved towards each other as the cap is moved towards the body portion.

3. The combination in a socket cap cord connection, of a body portion; two shouldered nuts mounted in said body portion; a flanged cap arranged to enclose the body portion; screws extending through openings in the cap and into the nuts; and two segmental clamping members resting in sockets in the cap and arranged to move towards each other when the cap is moved towards the body portion.

4. The combination in a socket cap cord connection, of a non-conducting body portion having a central opening enlarged at its lower end and having two openings therein; shouldered nuts mounted in said last-mentioned openings; a cap having a flange which is arranged to enclose the body portion; screws extending through openings in the cap and into the nuts; and two segmental clamping members, each member having a slot through which the screw extends, said clamping members being fulcrumed in the sockets in the cap.

5. The combination in a socket cap cord connection, of a body portion having a central opening therein and having two other openings; shouldered nuts mounted in said last-mentioned openings; a flanged cap having sockets; and segmental clamps, their outer ends resting in the sockets in the cap, said clamps being flanged at their inner ends and having slots therein; and screws extending through openings in the cap and through the slots in the clamps and into the nuts, so that when the cap is moved towards the body portion the clamping members will be caused to clamp the cord.

HENRY T. PAISTE.